United States Patent
Nickerson et al.

(10) Patent No.: US 11,854,180 B2
(45) Date of Patent: Dec. 26, 2023

(54) NON-CONTACT METHOD OF CHARACTERIZING ISOSTATIC STRENGTH OF CELLULAR CERAMIC ARTICLES

(71) Applicant: Corning Incorporated, Corning, NY (US)

(72) Inventors: Seth Thomas Nickerson, Corning, NY (US); David John Worthey, Pine City, NY (US)

(73) Assignee: Corning, Incorporated, Corning, NY (US)

( * ) Notice: Subject to any disclaimer, the term of this patent is extended or adjusted under 35 U.S.C. 154(b) by 269 days.

(21) Appl. No.: 16/069,426

(22) PCT Filed: Jan. 13, 2017

(86) PCT No.: PCT/US2017/013400
§ 371 (c)(1),
(2) Date: Jul. 11, 2018

(87) PCT Pub. No.: WO2017/123919
PCT Pub. Date: Jul. 20, 2017

(65) Prior Publication Data
US 2019/0026414 A1 Jan. 24, 2019

Related U.S. Application Data

(60) Provisional application No. 62/279,397, filed on Jan. 15, 2016.

(51) Int. Cl.
*G06T 7/00* (2017.01)
*B32B 3/12* (2006.01)
(Continued)

(52) U.S. Cl.
CPC .............. *G06T 7/0004* (2013.01); *B32B 3/12* (2013.01); *G06F 30/23* (2020.01); *G06V 10/34* (2022.01);
(Continued)

(58) Field of Classification Search
CPC .. G06F 30/23; G06F 2111/10; G06F 2119/18; B32B 3/12; G06K 9/26;
(Continued)

(56) References Cited

U.S. PATENT DOCUMENTS 6,820,022 B2 11/2004 Popp et al.
7,187,995 B2 3/2007 Floeder et al.
(Continued)

FOREIGN PATENT DOCUMENTS

JP 11277653 A 10/1999
JP 2007-248112 A 9/2007
(Continued)

OTHER PUBLICATIONS

Q. Wen and J. Wu, "Linear CCD Based Optical Tracking Using Stereo Correspondence Algorithm," 2009 International Conference on Artificial Intelligence and Computational Intelligence, Shanghai, 2009, pp. 422-425, doi: 10.1109/AICI.2009.90. (Year: 2009).*
(Continued)

*Primary Examiner* — Bradley A Teets
*Assistant Examiner* — Pursottam Giri
(74) *Attorney, Agent, or Firm* — Joseph M. Homa (57) ABSTRACT

A non-contact method of characterizing the isostatic strength of a ceramic member or article includes capturing a digital image of the ceramic article, and then forming a two-dimensional representation of the ceramic article and the web therein based on the captured digital image. The method also includes performing finite-element analysis on the two-dimensional representation of the ceramic article using
(Continued)

a select amount of simulated isostatic pressure to determine a maximum stress value within the two-dimensional representation of the web. The method further includes using the maximum stress value to characterize the isostatic strength of the ceramic article.

25 Claims, 7 Drawing Sheets (51) Int. Cl.
*G06F 30/23* (2020.01)
*G06V 10/34* (2022.01)
*G06V 30/144* (2022.01)
*G06F 111/10* (2020.01)
*G06F 119/18* (2020.01)

(52) U.S. Cl.
CPC ........ *G06V 30/144* (2022.01); *G06F 2111/10* (2020.01); *G06F 2119/18* (2020.01); *G06T 2207/30108* (2013.01); *G06V 2201/06* (2022.01); *Y02P 90/02* (2015.11)

(58) Field of Classification Search
CPC .............. G06K 9/24; G06T 7/0004; G06T 2207/30108; Y02P 90/02; G06V 10/34; G06V 30/144; G06V 2201/06
See application file for complete search history.

(56) References Cited

U.S. PATENT DOCUMENTS

| | | | |
|---|---|---|---|
| 7,212,228 B2 | 5/2007 | Utsumi et al. | |
| 7,215,808 B2 | 5/2007 | Miller | |
| 7,283,224 B1 | 10/2007 | Smithgall | |
| 7,560,154 B2 | 7/2009 | Katoh | |
| 7,655,195 B1* | 2/2010 | Ichikawa | F01N 3/01 422/180 |
| 7,712,375 B2 | 5/2010 | Toyoshima et al. | |
| 8,090,143 B2 | 1/2012 | Komaki et al. | |
| 8,270,701 B2 | 9/2012 | Floeder et al. | |
| 8,537,215 B2 | 9/2013 | Booth et al. | |
| 2002/0109112 A1 | 8/2002 | Guha et al. | |
| 2005/0147791 A1* | 7/2005 | Gulati | C04B 41/009 428/116 |
| 2005/0192784 A1 | 9/2005 | Itou et al. | |
| 2006/0092274 A1 | 5/2006 | Good | |
| 2006/0143671 A1 | 6/2006 | Ens et al. | |
| 2007/0091309 A1 | 4/2007 | Kondo | |
| 2009/0091615 A1 | 4/2009 | Tan et al. | |
| 2010/0208039 A1* | 8/2010 | Stettner | G01B 11/00 348/49 |
| 2010/0218596 A1* | 9/2010 | Poff | B01D 46/2418 73/37 |
| 2011/0116704 A1* | 5/2011 | Zoeller, III | G01N 21/95692 382/141 |
| 2011/0240190 A1* | 10/2011 | Summers | B60C 99/006 152/151 |
| 2012/0173216 A1 | 7/2012 | Koepsel et al. | |
| 2013/0212051 A1* | 8/2013 | Stephens, II | G06K 9/66 706/16 |
| 2013/0212151 A1 | 8/2013 | Herbach et al. | |
| 2018/0238683 A1* | 8/2018 | Watanabe | G06T 7/0008 |

FOREIGN PATENT DOCUMENTS

| | | |
|---|---|---|
| JP | 2007273537 A | 10/2007 |
| JP | 2011060391 A | 3/2011 |
| JP | 2013180566 A | 9/2013 |

OTHER PUBLICATIONS

Wang, A., and McDowell, D. L. (Mar. 18, 2004). "In-Plane Stiffness and Yield Strength of Periodic Metal Honeycombs." ASME. J. Eng. Mater. Technol. Apr. 2004; 126(2): 137-156. https://doi.org/10.1115/1.1646165 (Year: 2004).*

Natesaiyer, K., et al. "X-ray CT imaging and finite element computations of the elastic properties of a rigid organic foam compared to experimental measurements: insights into foam variability." Journal of materials science 50.11 (2015): 4012-4024. (Year: 2015).*

Chen et al. "Finite element analysis of the compressive and shear responses of structural foams using computed tomography." Composite Structures 159 (2017): 784-799. (Year: 2017).*

Natesaiyer, K., et al. "X-ray CT imaging and finite element computations of the elastic properties of a rigid organic foam compared to experimental measurements: insights into foam variability." Journal of materials science 50 (2015): 4012-4024. (Year: 2015).*

Gulati et al; "Isostatic Strength of Extruded Cordierite Ceramic Substrates"; SAE 2004 World Congress and Exhibition, SAE Technical Paper 2004-01-1135; 2004.

International Search Report and Written Opinion of the International Searching Authority; PCT/US2017/013400 dated May 4, 2017; 12 Pages; European Patent Office.

Langer et al; "OOF: An Image-Based Finite Element Analysis of Material Microstructures"; Materials Science; pp. 15-23; (2001).

English Translation of JP2018536793 Office Action dated Aug. 26, 2020; 4 Pages; Japanese Patent Office.

* cited by examiner

NON-CONTACT METHOD OF CHARACTERIZING ISOSTATIC STRENGTH OF CELLULAR CERAMIC ARTICLES

CROSS-REFERENCE TO RELATED APPLICATIONS

This application is a national stage application under 35 U.S.C. § 371 of International Patent Application Serial No. PCT/US2017/013400, filed on Jan. 13, 2017, which claims the benefit of priority of U.S. Provisional Application Serial No. 62/279,397 filed on Jan. 15, 2016, the contents of both are relied upon and incorporated herein by reference in their entireties.

FIELD

The present disclosure relates to cellular ceramic articles, and in particular relates to a method of characterizing the isostatic strength of ceramic articles such as extruded cellular ceramic articles.

The entire disclosure of any publication or patent document mentioned herein is incorporated by reference, including Pre-Grant Published Patent Application No. US 2013/0212151, and the article by S. T. Gulati et al, "Isostatic strength of extruded cordierite ceramic substrates," SAE 2004 World Congress and Exhibition, SAE Technical Paper 2004-01-1135, 2004, doi:10.4271/2004-01-1135; published Mar. 8, 2004.

BACKGROUND

Cellular ceramic articles are used as particulate filters and catalytic converters in internal combustion engines. The cells can be densely arranged to provide a relatively large surface area for catalytic material to react with the exhaust gases that pass through the cells. The walls can have a relatively thin cross-sectional dimension to provide a substantially large open frontal area, thereby reducing back pressure within the entire exhaust system. The cellular ceramic article requires sufficient mechanical and thermal integrity to withstand normal automotive impact and thermal requirements.

In particular, a ceramic article made for use as a vehicular filter or catalytic converter must have sufficient mechanical strength to survive being disposed in a metal housing during a process referred to as "canning." One measure of mechanical strength of a ceramic article is its isostatic strength. The isostatic strength of a ceramic article can be measured by subjecting the ceramic article to increasing amounts of an isostatic force or pressure to the point of structural failure. However, such a measurement results in damage to or destruction of the ceramic article and so is not a preferred method for characterizing isostatic strength, especially in a manufacturing environment. Such direct measurements of isostatic strength are also very time consuming and can slow down production.

SUMMARY

An aspect of the disclosure is a non-contact method for characterizing an isostatic strength SC of a ceramic article having a web defined by walls that in turn define an array of cells. The method comprises: a) capturing a digital image of the web; b) forming a two-dimensional (2D) representation of the ceramic article, comprising the web therein, based on the captured digital image; c) simulating a select amount of isostatic pressure $P_{ISO}$ applied to the 2D representation to determine a maximum stress value $\sigma_{C-MAX}$ within the 2D representation of the web; and d) using the maximum stress value $\sigma_{C-MAX}$ to determine the isostatic strength SC of the ceramic article.

Another aspect of the disclosure is the method described above, wherein act b) comprises representing the web using rectangular beam elements.

Another aspect of the disclosure is the method described above, wherein act c) comprises performing a finite-element analysis.

Another aspect of the disclosure is the method described above, wherein act d) comprises: defining a stress concentration factor $\sigma_F = \sigma_{C-MAX}/P_{ISO}$; and determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

Another aspect of the disclosure is the method described above, further comprising after act d): comparing the isostatic strength SC to a threshold value $S_{TH}$.

Another aspect of the disclosure is a non-contact method for characterizing an isostatic strength SC of a ceramic article having a web defined by walls that in turn define an array of cells. The method comprises a) capturing a digital image of the web; b) forming a 2D representation of the ceramic article, comprising the web therein, based on the captured digital image; c) performing a finite-element analysis on the 2D representation of the ceramic article using a select amount of simulated isostatic pressure $P_{ISO}$ to determine a maximum stress value $\sigma_{C-MAX}$ within the 2D representation of the web; and d) using the maximum stress value $\sigma_{C-MAX}$ to determine the isostatic strength SC of the ceramic article.

Another aspect of the disclosure is the method described above, wherein forming the 2D representation of the ceramic article of act b) comprises representing the web using 2D rectangular beam elements.

Another aspect of the disclosure is the method described above, further comprising, between act a) and act b), processing the captured digital image to form a processed image using at least one of a filtering operation, a dynamic threshold operation, an island-removal operation, a smoothing operation, and a hole-filling operation, and then using the processed image to perform acts b) through d).

Another aspect of the disclosure is the method described above, wherein act d) comprises: defining a stress concentration factor $\sigma_F = \sigma_{C-MAX}/P_{ISO}$; and determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

Another aspect of the disclosure is the method described above, wherein act a) comprises either directly capturing a two-dimensional digital image with a two-dimensional image sensor or capturing a series of one-dimensional images with a linear image sensor.

Another aspect of the disclosure is the method described above, further comprising after act d): comparing the isostatic strength SC to a threshold value $S_{TH}$.

Another aspect of the disclosure is the method described above, comprising basing the threshold value $S_{TH}$ on an anticipated use of the ceramic article.

Another aspect of the disclosure is a non-contact method of characterizing an isostatic strength SC of a ceramic article having a web that comprises walls that define an array of cells. The method comprises: a) capturing a digital image of the ceramic article and the web therein; b) processing the digital image to form a processed image; c) generating from the processed image a 2D representation of the ceramic article using rectangular beam elements to represent the web; d) determining a maximum stress value $\sigma_{C\text{-}MAX}$ within the web by simulating the application of a select amount of isostatic pressure $P_{ISO}$ to the 2D representation of the ceramic article; and e) using the maximum stress value $\sigma_{C\text{-}MAX}$ to determine the isostatic strength SC of the ceramic article.

Another aspect of the disclosure is the method described above, wherein processing the digital image comprises performing at least one of a filtering operation, a dynamic threshold operation, an island-removal operation, a smoothing operation, and a hole-filling operation.

Another aspect of the disclosure is the method described above, wherein act d) comprises performing a finite-element analysis.

Another aspect of the disclosure is the method described above, wherein act d) comprises: defining a stress concentration factor $\sigma_F = \sigma_{C\text{-}MAX}/P_{ISO}$; and determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

Another aspect of the disclosure is the method described above, wherein act a) comprises either directly capturing a two-dimensional digital image with a two-dimensional image sensor or capturing a series of one-dimensional images with a linear image sensor.

Another aspect of the disclosure is the method described above, further comprising after act e): comparing the isostatic strength SC to a threshold value $S_{TH}$.

Another aspect of the disclosure is the method described above, comprising basing the threshold value $S_{TH}$ on an anticipated use of the ceramic article.

Another aspect of the disclosure is the method described above, wherein the anticipated use is canning of the ceramic article.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1:
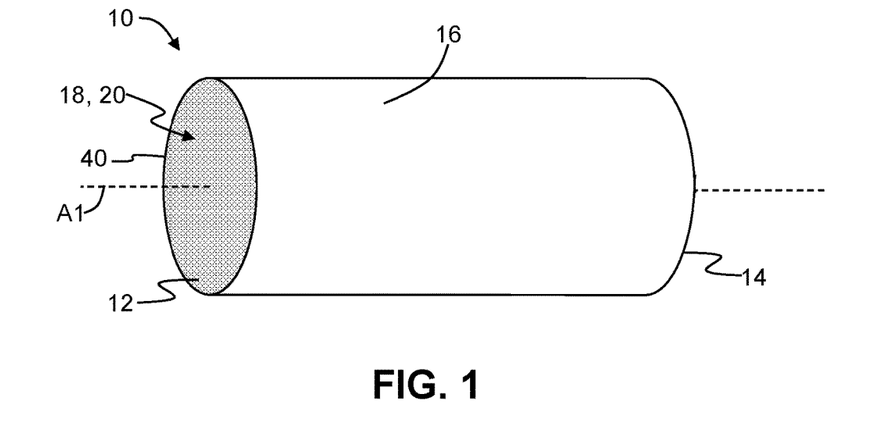
FIG. 1 is a side view of an example cellular ceramic article such as an extruded cellular ceramic article.
Figure 2:
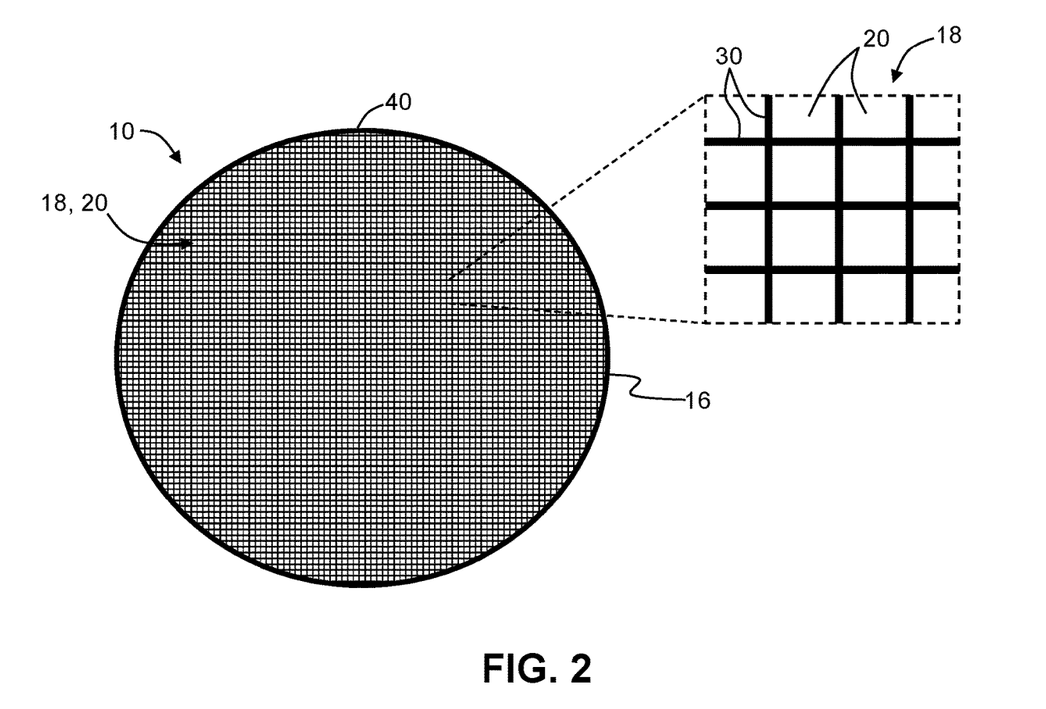
FIG. 2 is a close-up front-on view of the example cellular ceramic article of FIG. 1.

FIG. 1 is a side view of an example cellular ceramic article ("ceramic article") 10. FIG. 2 is a close-up, front-on view of the example ceramic article 10 of FIG. 1. The ceramic article 10 comprises a central axis Al, a front end 12, a back end 14, and an outer surface 16. Ceramic article comprises a web 18 defined by walls 30 that in turn define cells 20. The cells 20 can have shapes other than square, such as triangular, hexagonal, etc., depending on the type of extrusion die used to form ceramic article 10. An outer wall or skin 40 defines an outer shape of the ceramic article 10 as well as outer surface 16. The close-up inset of FIG. 2 illustrates an example portion of perfectly formed web 18 with perfectly formed walls 30 that define perfect cells 20.

Figure 3A:
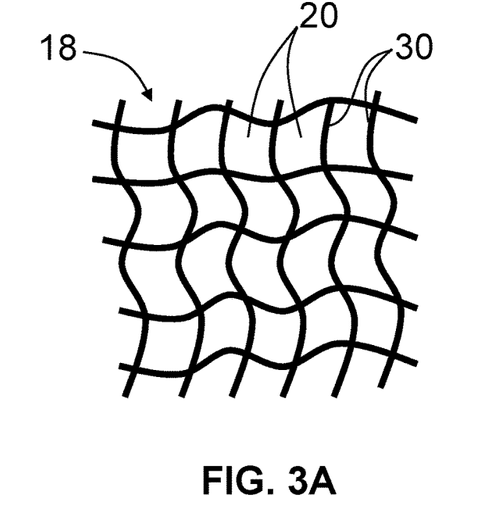
FIGS. 3A through 3D are close-up views of example webs of cellular ceramic articles, illustrating three different types of structural defects in the web that can reduce the isostatic strength of the ceramic article.
Figure 3B:
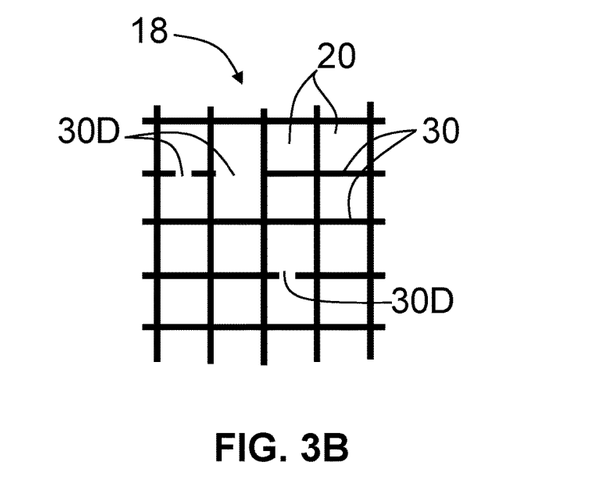
Figure 3C:
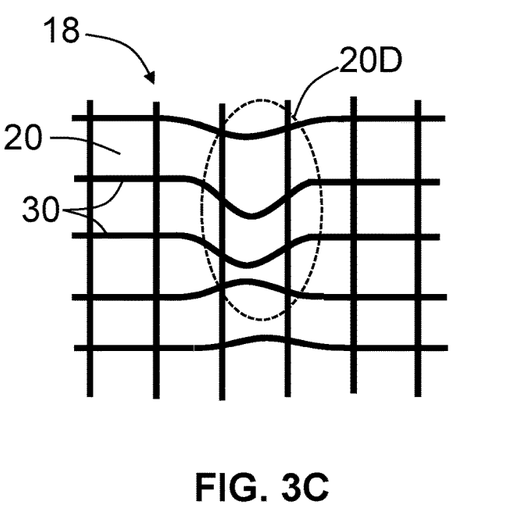
Figure 3D:
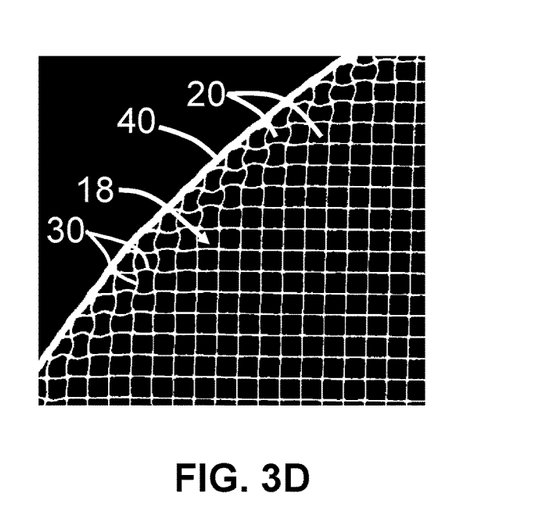

FIGS. 3A through 3D are close-up views of example webs 18 illustrating three different types of structural defects that can reduce the isostatic strength of ceramic article 10. FIG. 3A shows deformed "wavy" walls 30 that form distorted cells 20. FIG. 3B shows some walls having missing portions that represent wall defects 30D, which includes one wall that is essentially entirely missing. FIG. 3C shows an example of a local deformation in the walls 30 that result in a highly localized group of defective or deformed cells 20D. FIG. 3D shows "wavy" walls 30 located adjacent the outer wall or skin 40.

Given that the walls 30 of web 18 serve in large measure to define the isostatic strength of ceramic article 10, it is expected that wall/cell defects can reduce the isostatic strength. Yet, to date there has not been very good correlation between the type and location of wall/cell defects and isostatic strength. This has made it very difficult to use the characterization and location of wall/cell defects to obtain a reasonable estimate of the isostatic strength.

Characterization Method

An example method for characterizing isostatic strength disclosed herein comprises four main steps or acts: 1) image capture, 2) defining a 2D representation of the ceramic article, 3) calculating the maximum stress in the web, and 4) calculating the isostatic strength.

A fifth step of comparing the calculated isostatic strength to a threshold value can also be included in the method.

Each of the above main steps can comprise one or more sub-steps, operations, acts, etc. as described below.

Step 1—Image Capture

Figure 4A:
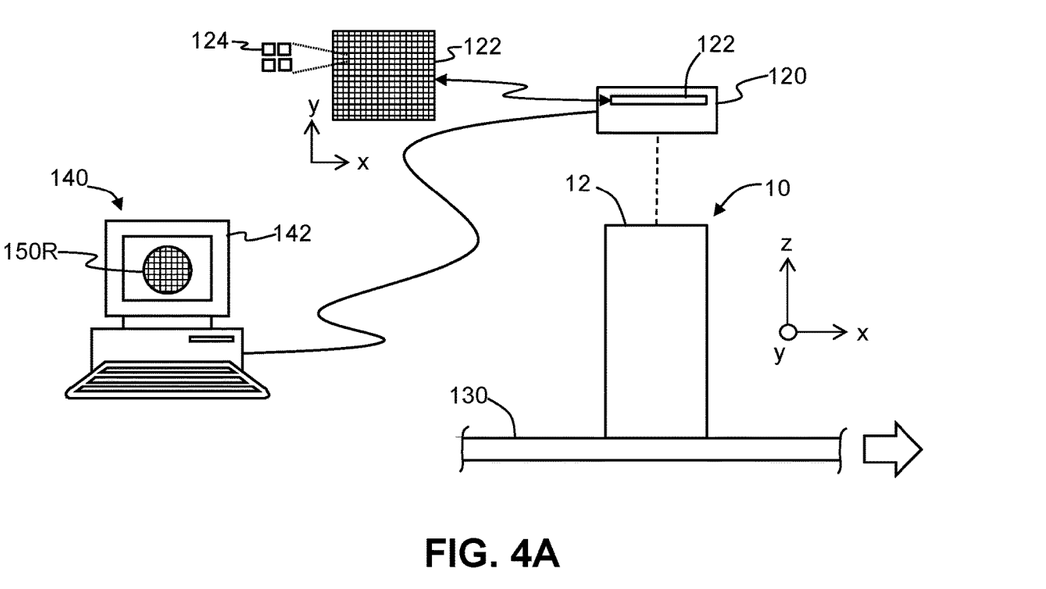
FIG. 4A is a schematic diagram that shows a digital camera arranged adjacent the front end of the cellular ceramic article, which resides on a conveyor.

The first step of the method involves capturing an image of the ceramic article 10 and the web 18 therein. FIG. 4A is a schematic diagram that shows a digital camera 120 operably arranged adjacent the front end 12 of ceramic article 10. The ceramic article 10 is supported by a conveyor 130 that conveys the ceramic article past a digital camera 120. The digital camera 120 comprises an image sensor 122 having pixels 124. The digital camera 120 is shown operably (e.g., electrically) connected to a computer 140 that has a display 142. The digital camera 120 is configured to capture a (raw) digital image 150R of at least a portion of web 18 at the front end 12 of the ceramic article.

Figure 4B:
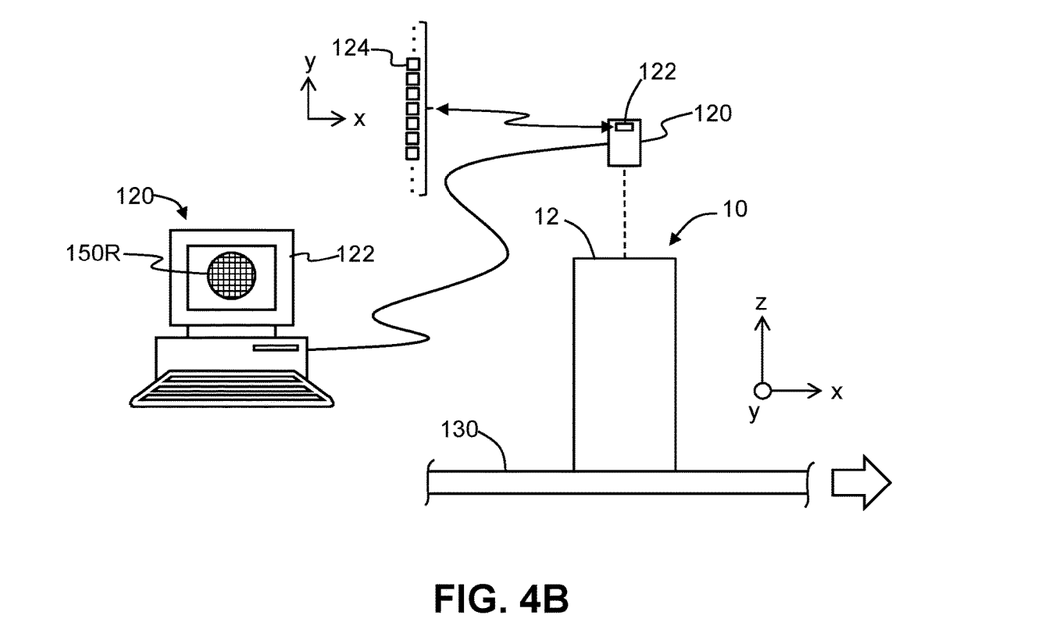
FIG. 4B is similar to FIG. 4A and illustrates an example wherein the digital camera comprises a linear sensor.

In an example illustrated in FIG. 4B, the image sensor 122 is a linear image sensor defined by a line of pixels 124 shown in the close-up inset as running in the y-direction. The linear image sensor 122 is used to capture a line image of the front end 12 of the ceramic article 10 as the ceramic article is conveyed past digital camera 120. In an example, the linear image sensor 122 is used as a line scanner and is arranged immediately adjacent the front end 12 of ceramic article 10 to capture a scanned digital image.

In an example, computer 140 is used to stitch together line-scan images of web 18 to form the larger 2D raw captured image 150R. In an example, the raw captured image 150R comprises the entire front end 12 of ceramic article 10 so that it includes the entire web 18. FIGS. 4A and 4B show the raw captured image 150R being displayed on display 142 of computer 140. Capturing an image of one end (e.g., front end 12) of the ceramic article 10 is usually sufficient to perform the method disclosed herein since the ceramic article is formed by extrusion and any defects tend be extrusion-related defects that are substantially consistent along the axial dimension of the ceramic article.

Figure 5A:
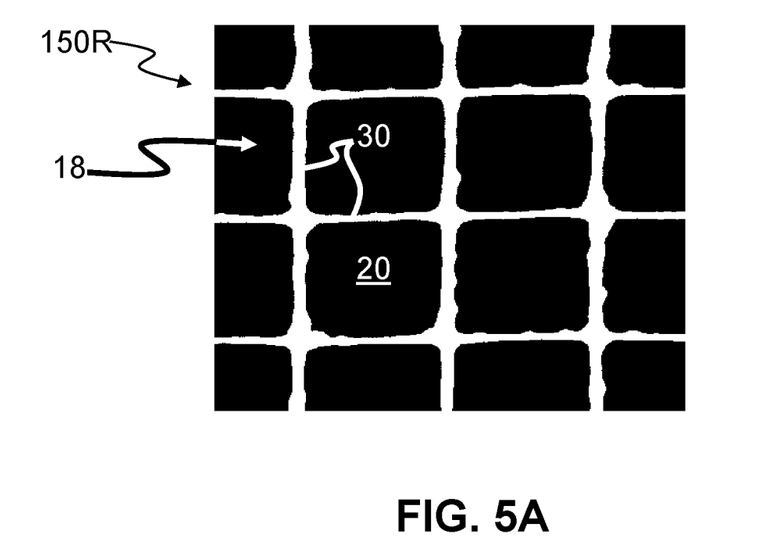
FIG. 5A is a representation of an example portion of an original or "raw" captured image.

The captured raw image 150R has associated therewith a first resolution defined by the relationship between the pixel size and the size of the captured image. In an example, digital camera 120 is configured such that each pixel 124 of image sensor 122 represents a 5 micron×5 micron region of web 18. Different optical resolutions can be used to change this pixel-to-region relationship. The optical resolution can be selected depending on the characteristics of the ceramic articles 10 being measured, e.g., different cell densities. A range of diameters of ceramic articles 10 can be from 4 inches to 14 inches. The cross-sectional shapes can also vary, e.g., round or oval. The captured raw image 150R at 5 microns per pixel level can thus range in size from 20,000×20,000 pixels for a 4 inch part to 70,000×70,000 pixels for a 14 inch part. An example of a portion of a captured raw image is shown in FIG. 5A.

Figure 5B:
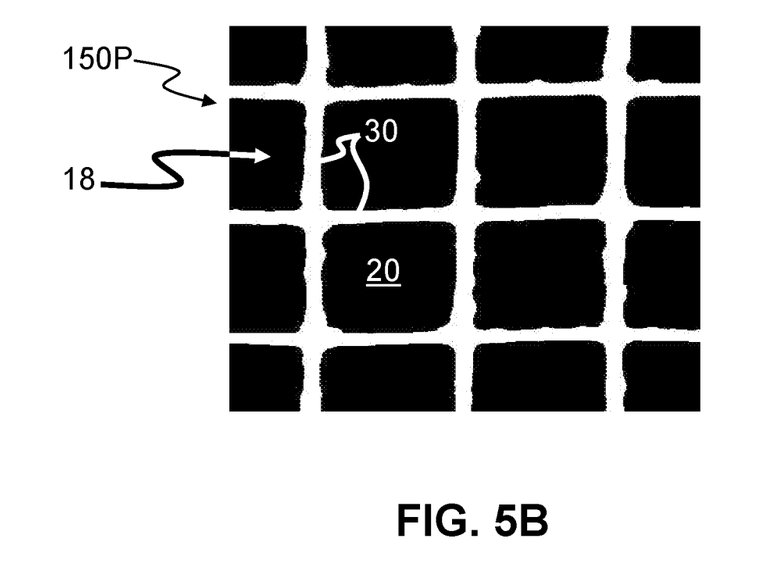
FIG. 5B is a representation of an example of a processed image formed from the raw captured image of FIG. 4B.

Once the captured raw image 150R of the front end 12 of ceramic article 10 is obtained, it can be processed using on ore more processing steps to form a processed image 150P, an example of which is shown in FIG. 5B. In an example, the processed image 150P has a second resolution that is equal to or less than the first resolution of the captured raw image 150R. Strictly speaking, the image processing step is optional within the main image capture step, but the characterization method disclosed herein benefits from including it, as explained below.

In an example, the image processing step comprises applying a mean filter to the captured image with an appropriate kernel size. The kernel size is chosen so the mean filter result represents the variation in illumination across the part. In an example, the kernel size is large enough so that the filtered image does not show the individual cells but is small enough so the filtered image shows variations in overall lighting in the image. In an example, the kernel size covers between 8 to 16 cells, or even 10 to 12 cells.

Next, a dynamic threshold operation is performed on the original (raw) captured image 150R. This operation finds all pixel values that are brighter than the corresponding pixel value in the mean filtered image by a certain amount. In an example, a threshold value of N grey levels is used. This selects all pixel values that are at least N grey levels brighter than the value of the corresponding pixel in the mean filtered image as possibly belonging to the ceramic article. Pixels having values that are darker than this intensity threshold value are considered to be background pixels that do not represent web 18 or skin 40.

Next, any isolated regions or "islands" of connected bright pixels that are smaller than some fixed size are removed. This "island removal" process is carried out to reduce noise since the small unconnected bright regions in the processed image 150P can be considered as not actually part of ceramic article 10. This can be done for islands having some minimum threshold size, e.g., less than 100 pixels.

Next, a morphological smoothing operation is performed by first closing any small dark regions in the ceramic article that are less than a certain size, and then performing a morphological opening to return the outline of ceramic article image to the original size. In an example, a morphological smoothing radius of approximately 3 pixels is convenient.

Next, any small holes represented by small dark areas in the image that do not meet the dynamic threshold limit are filled. For example, holes smaller than 400 pixels in size are filled. In an example where cells 20 are approximately 160×160 pixels (25,600 pixels in area), holes that are 1.5% the size of a normal cell can be filled. This operation is referred to herein as "hole filling."

All of the bright pixels that remain in the processed image 150P are considered to be part of the ceramic article 10. FIG. 5A is a representation of an example portion of an original (raw) captured image 150R while FIG. 5B represents an example of the corresponding processed captured image 150P.

Thus, in an example, the image processing step comprises at least one of a filtering operation, a dynamic threshold operation, an island-removal operation, a smoothing operation, and a hole-filling operation.

The raw captured image 150R and the processed image 150P each defines a two-dimensional representation of the web 18. The filtering, threshold, filling and smoothing operations result in the reduced second resolution for the processed image 150P as compared to the initial captured image 150R. The reduced resolution simplifies the subsequent methods steps or acts and maintaining sufficient information to obtain an accurate characterization of the isostatic strength of the ceramic article 10 being characterized. For example, the captured raw image 150R typically includes noise that can adversely affect the isostatic strength characterization. The processed image 150P is processed in a manner that reduces noise as compared to the captured raw image 150R and therefore can be effectively employed to achieve a more accurate characterization of the isostatic strength.

Step 2—Defining a 2D Representation of the Ceramic Article

Once the image capture step is completed, the resulting image (either the captured image 150R or the processed image 150P) is used to define a two-dimensional (2D) representation ("2D representation") 10R of the ceramic article 10) suitable for use in carrying out numerical simulations or modeling (see FIG. 7A, introduced and discussed below). In the discussion below, it is assumed for the sake of illustration that the processed image 150P is used to define the 2D representation 10R.

Figure 6A:
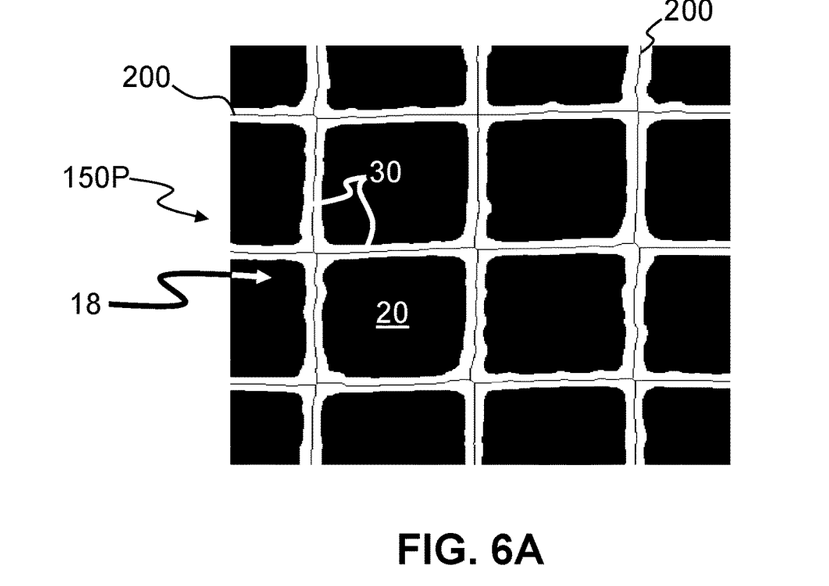
FIG. 6A is similar to FIG. 5B and shows an example of the skeleton that runs down the center of the web and that is used to determine the thickness of the web at various positions along the web walls.

In an example, the 2D representation 10R is generated by representing the walls 30 of web 18 and the outer wall or skin 40 in the processed image 150P as a series of 2D beam elements BE. In an example, the 2D beam elements BE are rectangular. With reference to FIG. 6A, this is accomplished by first finding a skeleton 200 of web 18 and outer wall or skin 40 in the processed image 150P. The skeleton 200 is a series of single-pixel lines that follow the medial axis of the web 18 and skin 40.

Figure 6B:
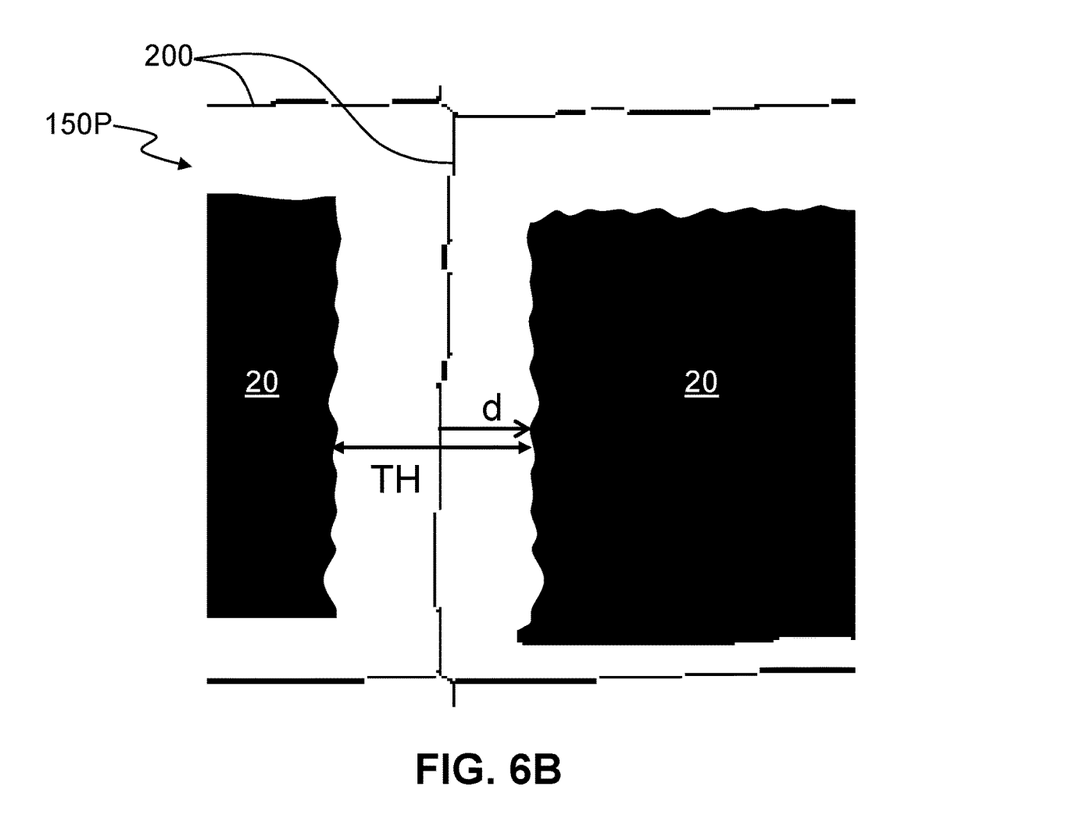
FIG. 6B is a close-up view showing how the thickness of the web wall is determined based on the skeleton.

With reference now to FIG. 6B, the next step involves calculating the distance d from each pixel along the skeleton 200 to the closest background (dark) pixel. This distance d represents half of the thickness of wall 30 at each point along the skeleton 200. Twice this distance is the all or web thickness TH at the given point of the measurement. FIG. 6B shows the measurement of distance d for one point along the skeleton 200 on a vertical wall 30.

The next step involves generating series of the beam elements BE that approximate the size, shape and location of each wall 30 in web 18. In an example, beam elements BE have a rectangular shape and are generated by following the path of the skeleton 200 along a given wall 30 (see FIG. 7B, introduced and discussed below). A given beam element BE has a width equal to the thickness TH of the wall 30 at the given location. A new beam element BE is generated any time the direction of the skeleton 200 deviates from a straight line by more than a certain number of pixels, or the wall thickness TH changes by more than a certain number of pixels.

Figure 7A:
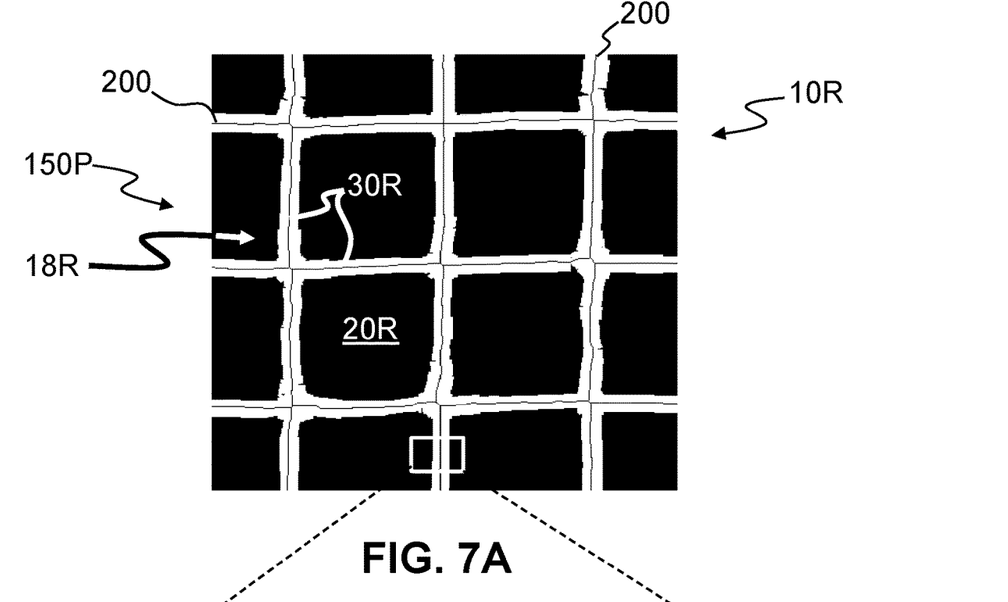
FIG. 7A is similar to FIG. 6A and shows a two-dimensional representation of a cellular ceramic article wherein the web is represented by rectangular beam elements that vary in size with the thickness of the web walls.
Figure 7B:
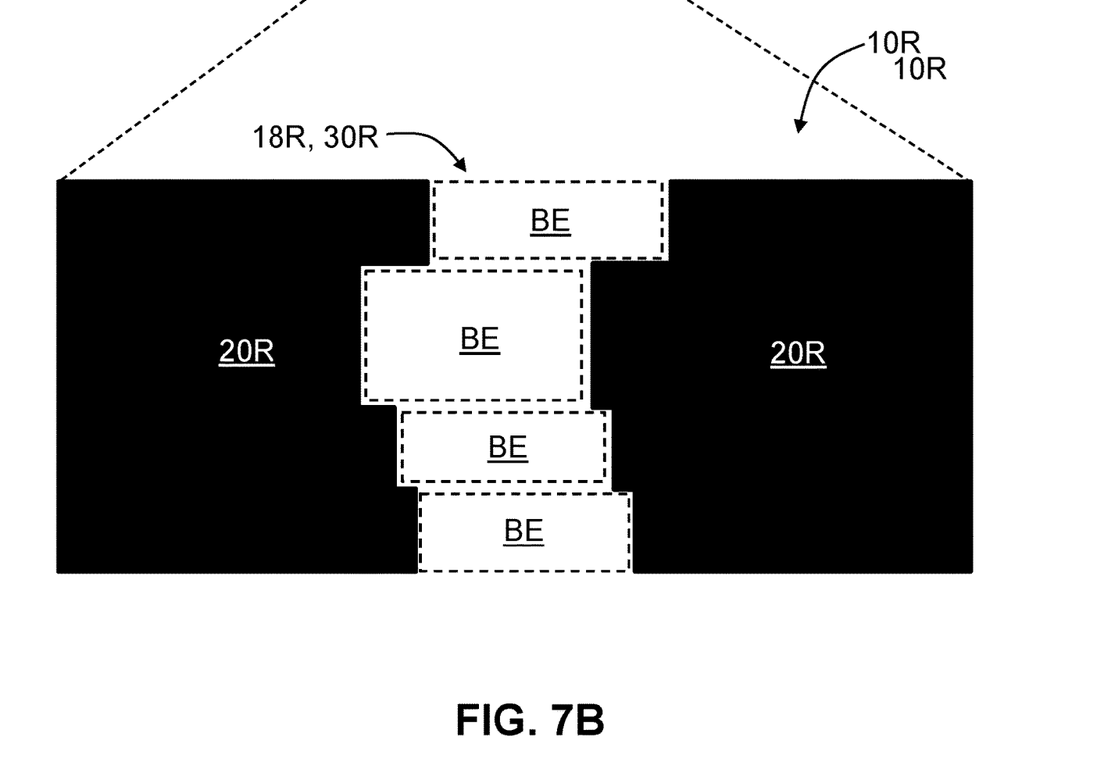
FIG. 7B is similar to FIG. 6B and shows a close-up view of some example rectangular beam elements that define a portion of a web wall of FIG. 7A.

FIG. 7A is similar to FIG. 6A and represents an example 2D representation 10R of ceramic article 10. The 2D representation 10R comprises web 18R, walls 30R and cells 20R. The differences between FIGS. 6A and 7A are subtle, but a close inspection shows that FIG. 7A has more squared-off edges between the light portion that defines the walls 30R of web 18R and the black background portion of the image that define cells 20R. FIG. 7B is a close-up view of portion of web 18R and shows a number of example beam elements BE as identified by the dashed-line boxes. The beam elements BE in FIG. 7B are shown slightly smaller than their actual size so that they can be readily seen.

In an example, direction changes in skeleton 200 or thickness changes in wall 30R that are greater than some number of pixels (e.g., 1 to 3 pixels) are tracked and used to define new beam elements BE. The smaller the change threshold used to define new beam elements BE, the more accurately the actual geometry of ceramic article 10 is captured by the 2D representation 10R. Using a larger change threshold reduces accuracy, but also reduces the number of generated beam elements BE, thus decreasing the computation time needed to calculate the stresses as described below.

The beam elements BE are defined for the various walls 30R to make up web 18R. In an example, standard computer techniques can be used to define the beam elements BE and link them together to form web 18R. This can be done using computer 140 and standard computer techniques, such as by using ANSYS files, which support reading the rectangular beam data from ASCII coded files. The ANSYS files describe individual rectangular beam elements of the ceramic article 10 and how these beam elements are linked together to form web 18R as well as skin 40R (see FIG. 8, introduced and discussed below).

In an example, computer 140 comprises instructions embodiment in a non-transient computer-readable medium that walks the list of generated beam elements BE to define web 18R of the 2D representation 10R of ceramic article 10.

Step 3—Calculating the Maximum Stress in the Web

Figure 8:
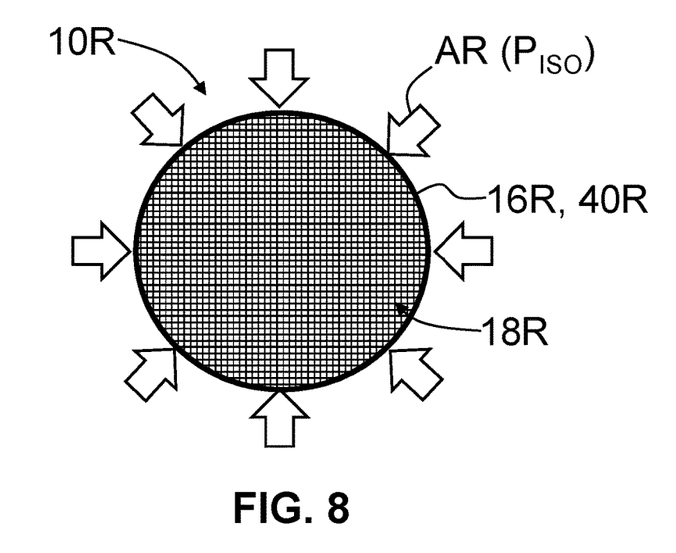
FIG. 8 shows an example 2D representation of the ceramic article, with the large arrows showing the isostatic pressure $P_{ISO}$ being applied inwardly at the outer surface, according to the simulation.

Standard numerical techniques are then used to model (simulate) the 2D mechanical response of the 2D representation 10R of the ceramic article to a select (simulated) isostatic pressure $P_{ISO}$. FIG. 8 shows an example 2D representation 10R of ceramic article 10, with arrows AR showing the isostatic pressure $P_{ISO}$ being applied inwardly at the outer surface 16R of skin 40R according to the simulation. In an example, the select amount of isostatic pressure PISO being applied falls within a range of reasonable isostatic pressures that a ceramic article 10 typically might experience in the field, e.g., from close to zero up to its design isostatic strength.

This modeling or simulation of the 2D mechanical response can be accomplished using for example finite-element analysis, with the mechanical response being measured in terms of stress at various locations (e.g., beam elements BE) in web 18R. In an example, the output of the finite-element analysis comprises linearized calculated stress values $\sigma_C$ for each rectangular beam element RB. The results can be stored in computer 140, e.g., as an ASCII file. The maximum value of the calculated stress is denoted $\sigma_{C-MAX}$ and is easily determined from the list of calculated stress values $\sigma_C$.

In an example, the maximum calculated stress value $\sigma_{C-MAX}$ is used to define a stress concentration factor $\sigma_F$. The stress concentration factor $\sigma_F$ is defined by the ratio of the maximum calculated stress value $\sigma_{C-MAX}$ to the applied isostatic pressure $P_{ISO}$, e.g., $\sigma_F = \sigma_{C-MAX}/P_{ISO}$. The stress concentration factor $\sigma_F$ is unitless since the calculated stress values and the isostatic pressure $P_{ISO}$ have the same units, e.g., PSI or bars. In an example, the stress concentration factor $\sigma_F$ falls mostly within the range between about 5 and about 80, with lower and higher extremes possible.

Step 4—Calculating the Isostatic Strength

The next step involves calculating the isostatic strength SC. This is accomplished in one example by using an equation (relationship) that relates the stress concentration factor $\sigma_F$ to the calculated isostatic strength SC.

An example equation can be expressed as:

$$1/\sigma_F = \alpha \cdot SC - \beta \qquad \text{EQ. 1}$$

Here, $\alpha$ and $\beta$ are constants determined by a best-fit to EQ. 1 using actual measurements of isostatic strength SM on test ceramic articles in place of SC. The test ceramic articles are also modeled using the method described above to obtain corresponding values of $\sigma_F$ so that enough data with different values for the measured isostatic strength SM can be obtained to perform a reasonable curve fit. The test ceramic articles need to be substantially the same (and preferably formed in an identical manner as possible) as the ceramic articles whose isostatic strength is to be characterized using the non-contact methods disclosed herein in order to achieve the best results.

EXAMPLE

In one example, measurements of isostatic strength SM were performed on test ceramic articles formed from cordierite having square cells with a density of 200 cells per inch and a web wall thickness TH of 0.008 inch. The test ceramic articles had a variety of web and cell defects, comprising sheared cells, distorted cells and missing cell walls and thus had a range of measured isostatic strengths SM. The measurements of isostatic strength SM were carried out using a conventional apparatus. The modeling to obtain the stress concentration factor $\sigma_F$ was carried out per the above steps for each of the test ceramic articles. The beam elements BE used were rectangular.

Figure 9:
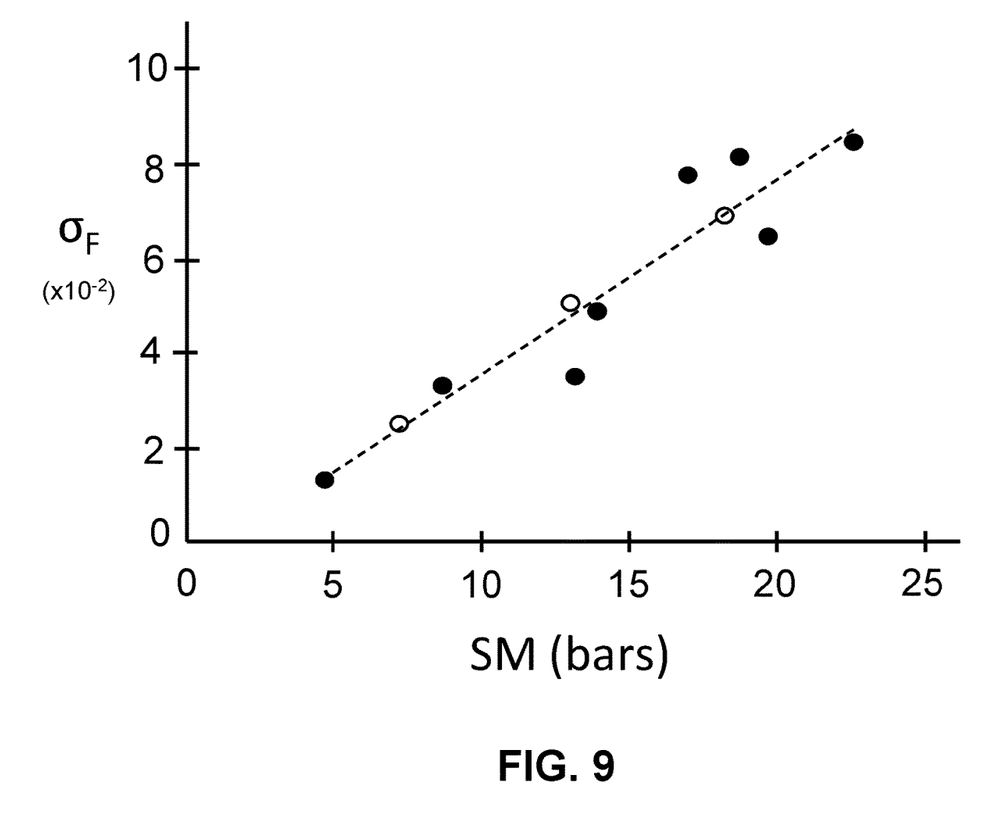
FIG. 9 is plot of $1/\sigma_F$ versus the measured isostatic strength SM (bars) for the data obtained from modeling and then testing eleven test ceramic articles of the same type, with the plot including a best-fit line having an $R^2$ value of 0.9.

FIG. 9 is plot of $1/\sigma_F$ versus measured isostatic strength SM (bars) for the data obtained from modeling and measurements performed on the above-described test ceramic articles. The solid black circles represent test ceramic articles that had sheared cells 20 while the white-filled circles represent test ceramic articles that had cut webs 18 (i.e., cuts in walls 30).

A best-fit calculation to the data in FIG. 9 was performed based on EQ. 2 below and is represented by the dashed straight in in FIG. 9:

$$1/\sigma_F = \alpha \cdot SM - \beta \qquad \text{EQ. 2}$$

The best-fit calculation was carried out using standard spreadsheet software and yielded values for the curve-fitting constants $\alpha$ and $\beta$ of $\alpha=0.0041$ and $\beta=0.0054$, with an $R^2$ value of 0.9, indicating good correlation between the stress concentration factor $\sigma_F$ and the measured isostatic strength SM. These values of $\alpha$ and $\beta$ can be used in EQ. 1 for non-contact characterizing the isostatic strength for like ceramic articles as described above.

The curve-fitting approach to establish a relationship between the stress concentration factor $\sigma_F$ and the isostatic strength can be carried out for any type of ceramic articles 10, particularly extruded ceramic articles, irrespective of the composition, cell design (hexagonal, triangular, square, octasquare, asymmetric, etc.) and web/cell geometry (e.g., cell sizes and densities, wall thicknesses, etc.).

In characterizing the isostatic strength, only the maximum value of the stress $\sigma_{C-MAX}$ is required. Thus, an embodiment of the method comprises using only the maximum stress value $\sigma_{C-MAX}$ to characterize the isostatic strength SC of the ceramic article.

Step 6—Comparing the calculated isostatic strength to a threshold value.

Once the calculated isostatic strength SC is obtained, it can be compared to a threshold value $S_{TH}$. The threshold value $S_{TH}$ can be defined by a use for the ceramic article 10, and the demands such use will place on the particular ceramic article. For example, the threshold value $S_{TH}$ can be defined by or required by a canning process and whether the ceramic article can survive the process. Not all canning processes have the same isostatic strength requirements, so that the threshold value $S_{TH}$ can vary between different canning processes. For example, some canning processes might have an isostatic strength threshold value $S_{TH}=10$ bars, while others can have an isostatic strength threshold value $S_{TH}=30$ bars or 50 bars or greater. A benefit of having a non-contact characterization of the isostatic strength is that ceramic articles can be grouped by their characterized isostatic strength and then used for applications where the threshold value requirement can be met without damaging or destroying the ceramic articles.

The non-contact method of characterizing the isostatic strength of ceramic articles as disclosed herein has the advantage that it is based on a single parameter namely, the maximum value of the calculated stress $\sigma_{C-MAX}$ (or the stress concentration factor, which is based only on the maximum stress value $\sigma_{C-MAX}$). The method does not require an examination or characterization of the many different types of possible cell or web defects, such as sheared cells, distorted cells, missing webs, thinned webs, etc., and does not require determining the location(s) of such defects.

Without wishing being bound by theory, it is conjectured that a single location of sufficiently high stress within the web 18 of a ceramic article 10 can compromise the structural integrity of the entire ceramic article and lead to a substantial reduction in the isostatic strength, e.g., to be below a desired threshold value $S_{TH}$. For example, when an isostatic force or pressure is applied to the outer surface 16 of ceramic article 10 that comprises a cell or web defect, the force is communicated through web 18 and to a highest-stress location, which may not identically correspond to a web or cell defect. The force can cause failure of one or more walls 30 within the web 18 at or near the high stress location. This wall failure causes the applied force to be immediately redistributed to the surrounding walls 30 of the nearest web 18. The added force can then lead to failure of one or more of the surrounding walls, thereby causing the applied force to be redistributed once again to the adjacent surrounding walls 30. This failure process can end up cascading through substantial portions of web 18, leading to the structural failure of the ceramic article.

In an example, the non-contact method disclosed herein is used in the production of ceramic articles and can be performed at any step along the manufacturing process where an image of the web can be obtained. In one example, the non-contact method is performed on newly extruded wet logs, while in another example the non-contact method is performed on dried logs, while in yet another example the non-contact method is performed on dried and fired logs. In an example, the non-contact method is performed in less than 1 minute, thereby providing a relatively quick characterization of the isostatic strength as compared to direct contact-based methods. Thus, in this regard, the term "ceramic article" as used herein is intended to also include "ceramic-forming article" such as greenware or unfinished ware, such as newly extruded wet logs, or dried logs or green logs, or fired logs, or newly extruded wet cellular structured bodies, or dried cellular structured bodies, and the like.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A non-contact method for processing and preventing damage to a ceramic article having a web defined by walls that in turn define an array of cells, the web being surrounded by a skin that provides an outer surface of the ceramic article, the method comprising:
    a) capturing, via a linear image sensor operably arranged adjacent to a front end of the ceramic article during a manufacturing process, a digital image of the web, wherein pixels in the digital image corresponding to the walls of the web are a different brightness than background pixels where the walls are absent, and wherein the linear image sensor is operably connected to a computer configured to stitch together line-scan images of the web to form the digital image;
    b) converting the captured digital image of the web into a two-dimensional (2D) representation of the ceramic article having a surface, comprising the web therein, based on the captured digital image, wherein converting the captured digital image of the web into the 2D representation of the ceramic article comprises:
    forming a skeleton of the web from the captured digital image, the skeleton comprising a series of single pixel lines that follow a medial axis of each wall in the web;
    generating a series of beam elements along the skeleton, the beam elements being based on a thickness of the web at various positions along the walls, wherein the thickness of the web is based on a distance from the skeleton at each of the various positions to a closest of the background pixels in the digital image; and
    linking and arranging the series of beam elements along the skeleton to represent the walls of the web, wherein the beam elements vary in size with the thickness of the walls at the various positions;
    c) simulating a select amount of isostatic pressure $P_{ISO}$ applied to the surface of the 2D representation to determine a maximum stress value $\sigma_{C-MAX}$ within the 2D representation of the web; and web; and
    d) using the maximum stress value $\sigma_{C-MAX}$ to determine the isostatic strength SC of the ceramic article,
    wherein a plurality of ceramic articles are processed non-contactedly by repeating steps a) to d) for each of the ceramic articles to determine the isostatic strength values for each of the ceramic articles, and
    wherein the ceramic articles are grouped according to respective isostatic strength.

2. The non-contact method according to claim 1, wherein act c) comprises performing a finite-element analysis.

3. The non-contact method according to claim 1, wherein act d) comprises:
    defining a stress concentration factor $\sigma_{C-MAX} = \sigma_{C-MAX} / P_{ISO}$; and
    determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

4. The non-contact method according to claim 1, further comprising after act d):
    comparing the isostatic strength SC to a threshold value $S_{TH}$.

5. The non-contact method of claim 4, further comprising:
    using the ceramic article in a canning process.

6. The non-contact method of claim 1, wherein each successive beam element in each series of beam elements is generated at locations where a direction of the skeleton deviates from a straight line by more than a threshold number of pixels in the digital image or where the thickness of the web changes by more than the threshold number of pixels.

7. The non-contact method of claim 6, wherein the threshold number of pixels is from 1 pixel to 3 pixels.

8. The method of claim 1, wherein a first set of the ceramic articles consists of ceramic articles which have respective isostatic strengths which are greater than or equal to a first isostatic strength threshold.

9. The method of claim 8, wherein pressure up to the first isostatic strength threshold is applied to the surface of the 2D representation of the ceramic articles in the first set to prevent damage to the ceramic article.

10. The method of claim 9, wherein the pressure is applied during canning of the ceramic article.

11. The method of claim 8, wherein the ceramic articles of a second set of the ceramic articles, which are not in the first set, have respective isostatic strengths which are not greater than the first isostatic strength threshold, and which are greater than or equal to a second isostatic strength threshold, wherein the second isostatic strength threshold is lower than the first isostatic strength threshold.

12. The method of claim 11, wherein pressure up to the second isostatic strength threshold is applied to the surface of the 2D representation of the ceramic articles in the second set to prevent damage to the ceramic article.

13. The method of claim 12, wherein the pressure is applied to the ceramic articles of the first set by a first canning process, and the pressure is applied to the ceramic articles of the second set by a second canning process different from the first canning process.

14. A non-contact method for processing and preventing damage to a ceramic article having a web defined by walls that in turn define an array of cells, the web being surrounded by a skin that provides an outer surface of the ceramic article, the method comprising:
    a) capturing, via a linear image sensor operably arranged adjacent to a front end of the ceramic article during a manufacturing process, a digital image of the web, wherein pixels in the digital image corresponding to the walls of the web are a different brightness than background pixels where the walls are absent, and wherein the linear image sensor is operably connected to a computer configured to stitch together line-scan images of the web to form the digital image;
    b) converting the captured digital image of the web into a two-dimensional (2D) representation of the ceramic article having a surface, comprising the web therein, based on the captured digital image, wherein converting the captured digital image of the web into the 2D representation of the ceramic article comprises:
    forming a skeleton of the web from the captured digital image, the skeleton comprising a series of single pixel lines that follow a medial axis of each wall in the web;
    generating a series of beam elements along the skeleton, the beam elements being based on a thickness of the web at various positions along the walls, wherein the thickness of the web is based on a distance from the skeleton at each of the various positions to a closest of the background pixels in the digital image; and
    linking and arranging the series of beam elements along the skeleton to represent the walls of the web, wherein the beam elements vary in size with the thickness of the walls at the various positions;

c) performing a finite-element analysis on the 2D representation of the ceramic article using a select amount of simulated isostatic pressure $P_{ISO}$ applied to a surface of the 2D representation to determine a maximum stress value $\sigma_{C-MAX}$ within the 2D representation of the web; and d) using the maximum stress value $\sigma_{C-MAX}$ to determine the isostatic strength SC of the ceramic article, wherein a plurality of ceramic articles are processed non-contactedly by repeating steps a) to d) for each of the ceramic articles to determine the isostatic strength values for each of the ceramic articles, and wherein the ceramic articles are grouped according to respective isostatic strength.

15. The non-contact method according to claim 14, further comprising, between act a) and act b), processing the captured digital image to form a processed image using at least one of a filtering operation, a dynamic threshold operation, an island-removal operation, a smoothing operation, and a hole-filling operation, and then using the processed image to perform acts b) through d).

16. The non-contact method according to claim 14, wherein act d) comprises:

defining a stress concentration factor $\sigma_F = \sigma_{C-MAX}/P_{ISO}$; and determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

17. The non-contact method according to claim 14, wherein act a) comprises either directly capturing a two-dimensional digital image with a two-dimensional image sensor or capturing a series of one-dimensional images with a linear image sensor.

18. The non-contact method according to claim 14, further comprising after act d):

comparing the isostatic strength SC to a threshold value $S_{TH}$.

19. The non-contact method according to claim 18, comprising basing the threshold value $S_{TH}$ on a use of the ceramic article.

20. A non-contact method processing and preventing damage to a ceramic article having a web that comprises walls that define an array of cells, the web being surrounded by a skin that provides an outer surface of the ceramic article, the method comprising:

a) capturing, via linear image sensor operably arranged adjacent to a front end of the ceramic article during a manufacturing process, a digital image of the ceramic article and the web therein, wherein pixels in the digital image corresponding to the walls of the web are a different brightness than background pixels where the walls are absent, and wherein the linear image sensor is operably connected to a computer configured to stitch together line-scan images of the web to form the digital image;

b) processing the digital image to form a processed image;

c) generating from the processed image a two-dimensional (2D) representation of the ceramic article having a surface, the generating including:

forming a skeleton of the web from the captured digital image, the skeleton comprising a series of single pixel lines that follow a medial axis of each wall in the web;

generating a series of beam elements along the skeleton, the beam elements being based on a thickness of the web at various positions along the walls, wherein the thickness of the web is based on a distance from the skeleton at each of the various positions to a closest of the background pixels in the digital image; and using the series of beam elements arranged along the skeleton to represent the walls of the web wherein the series of beam elements vary in size with the thickness of the walls at the various positions;

d) simulating the application of a select amount of isostatic pressure $P_{ISO}$ to the surface of the 2D representation of the ceramic article to determine a maximum stress value $\sigma_{C-MAX}$ within the web; and e) using the maximum stress value $\sigma_{C-MAX}$ to determine the isostatic strength SC of the ceramic article, wherein a plurality of ceramic articles are processed non-contactedly by repeating steps a) to e) for each of the ceramic articles to determine the isostatic strength values for each of the ceramic articles, and wherein the ceramic articles are grouped according to respective isostatic strength.

21. The non-contact method according to claim 20, wherein act d) comprises performing a finite-element analysis.

22. The non-contact method according to claim 20, wherein act d) comprises:

defining a stress concentration factor $\sigma_F = \sigma_{C-MAX}/P_{ISO}$; and determining the isostatic strength SC via the relationship $1/\sigma_F = \alpha \cdot SC - \beta$, wherein $\alpha$ and $\beta$ are constants determined by a best-fit to said relationship but using measured values of isostatic strength SM made on test ceramic articles.

23. The non-contact method according to claim 20, further comprising after act e):

comparing the isostatic strength SC to a threshold value $S_{TH}$.

24. The non-contact method according to claim 23, comprising basing the threshold value $S_{TH}$ on a use of the ceramic article.

25. The non-contact method according to claim 24, wherein the use is canning of the ceramic article.

* * * * *